United States Patent [19]

Nagashima et al.

[11] Patent Number: 4,903,462
[45] Date of Patent: Feb. 27, 1990

[54] OIL MIST REMOVER

[75] Inventors: Tsueno Nagashima; Makoto Yamane, both of Osaka, Japan

[73] Assignees: Tabai Espec Co. Ltd.; Itoman & Co. Ltd., both of Osaka; Taichi Uchida, Kyoto, all of Japan

[21] Appl. No.: 237,239

[22] Filed: Aug. 26, 1988

[30] Foreign Application Priority Data

Aug. 31, 1987 [JP] Japan ................................ 62-218123
Aug. 31, 1987 [JP] Japan ................................ 62-218126
Aug. 31, 1987 [JP] Japan ........................... 62-133313[U]

[51] Int. Cl.$^4$ ............................................ B01D 50/00
[52] U.S. Cl. ....................................... 55/317; 55/400; 55/466
[58] Field of Search ................. 55/317, 351, 400, 465, 55/466

[56] References Cited

U.S. PATENT DOCUMENTS

| | | | |
|---|---|---|---|
| 1,762,028 | 6/1930 | Phelps | 55/400 |
| 1,914,667 | 6/1933 | Kolla | 55/274 |
| 2,415,621 | 2/1947 | Arnhym | 55/467 |
| 2,459,944 | 1/1949 | Jones et al. | 55/466 |
| 3,018,896 | 1/1962 | Gewiss | 55/400 |
| 3,816,981 | 6/1974 | Carnewal et al. | 55/467 |
| 4,067,703 | 1/1978 | Dullien et al. | 55/400 |
| 4,099,942 | 7/1978 | Carnewal et al. | 55/466 |
| 4,189,310 | 2/1980 | Hotta | 55/400 |

FOREIGN PATENT DOCUMENTS

| | | | |
|---|---|---|---|
| 778750 | 11/1980 | U.S.S.R. | 55/400 |
| 1327934 | 8/1987 | U.S.S.R. | 55/400 |
| 2068772 | 8/1981 | United Kingdom | 55/351 |

Primary Examiner—Jay H. Woo
Assistant Examiner—C. S. Bushey
Attorney, Agent, or Firm—Koda & Androlia

[57] ABSTRACT

An oil mister remover used in purifying polluted air containing oil mist generated in a factory or the like, composed of a main body having a suction hole, a ventilation chamber having an exhaust provided in the main body and a member having liquid discharger provided in the main body. The ventilation chamber is formed gradually larger in diameter toward the rotating direction of the fan, the inner edge of a suction guide for guiding the air into to the fan is curved so that the diameter may be larger than the fan and a drum having a rotary filter is provided in the main body. Multiple tiny holes are formed in the drum provided in the main body, and a curvature is formed beneath these tiny holes.

3 Claims, 9 Drawing Sheets

OIL MIST REMOVER

BACKGROUND OF THE INVENTION

1. Field of the Invention

This invention relates to an oil mist remover, and more particularly to an oil mist remover used for purifying the polluted air containing oil mist generated in a factory or the like.

2. Prior Art

In a conventional oil mist remover, the air introduced from the suction hole was sent out of the filter by the fan by passing through the ventilation chamber formed outside the filter, and this ventilation chamber was formed in the same size before and after outside the filter.

At this time, in the rear part of the ventilation chamber, since the air pressure is small and the air is efficiently sent out from the filter, but as the air is discharged from the whole circumference of the filter, the air pressure increases as going toward the front side of the ventilation chamber (the rotating direction of the fan), and the air send-out efficiency from the filter tends to be worse. In this prior art, therefore, it was impossible to obtain an efficient air passing state.

Besides, in the conventional oil mist remover, a suction guide for guiding the air introduced from the suction hole into the fan was provided, and the inner edge of this suction guide was straight toward the fan.

Since the diameter of this suction guide is smaller than the outside diameter of the fan, if the shape of the inner edge of the suction guide is straight, the air flowing out of the suction guide cannot reach up to the outer circumference of the fan, and when the fan rotates, the air diffusion is not executed on the outer circumference of the fan, which meant poor efficiency of the fan.

Furthermore, in another conventional oil mist remover, multiple tiny holes were formed in the drum, and a filter was attached to the inner surface, and the drum was rotated together with the fan disposed within the drum. Such device is intended to diffuse the air containing the oil mist into the drum by means of the fan, adsorb the oil mist on the filter, and discharge only air from the tiny holes. However, since the tiny holes in the conventional device are not matched with the air flow, wind screening sound was generated beneath the tiny holes, which not only caused noise but also disturbed the air flow, limiting its range smaller than the hole diameter, thereby leading to decrease of flow rate and increase of pressure loss.

BRIEF SUMMARY OF THE INVENTION

This invention is based on the expectation that, in the light of the background discussed above, the pressure would not increase toward the front side of the ventilation chamber in the functioning of this equipment when the ventilation chamber is formed to be gradually larger toward the rotating direction of the fan.

It is hence a primary object of this invention to present an equipment capable of efficiently removing oil mist, by improving the send-out efficiency of air into the ventilation chamber, that is, by enhancing the air passing state.

It is other object of this invention to present an oil mist remover improved in the fan operating efficiency, by allowing the air flowing out of the suction guide to reach up to the outer circumference of the fan so as to diffuse the air on the entire surface of the fan.

It is another object of this invention to present an oil mist remover capable of making smooth the air flow from the tiny holes, preventing wind screening sound, increasing the flow rate, and decreasing the pressure loss.

The features and benefits of this invention, as well as other objects thereof, will be more clearly understood from the following detailed description taken in conjunction with the accompanying drawings.

In order to achieve these and other objects to be clarified in the explanations to follow, this invention has a filter disposed outside the fan provided in order to suck the air containing oil mist from the suction hole to diffuse outward, and a ventilation chamber formed outside this filter, and this ventilation chamber is formed gradually larger toward the rotating direction of the fan.

Besides, the inner edge of the suction guide for guiding the air containing oil mist sucked in from the suction hole into the fan is curved so that the diameter becomes larger toward the fan.

Furthermore, installing a drum having a rotary filter in the main body, multiple tiny holes are provided in the drum and a curvature is formed beneath the tiny holes.

In this way, the air passage may be made smoothly, and by using the oil mist remover of this invention, efficient oil mist removal is realized.

This air chamber, forming the guide wall in a spiral shape inside the main body, has the interval between the fixed filter and the guide wall gradually increased as going forward.

Therefore, even by the air successively sent out from the whole circumference of the fixed filter, the air pressure in the ventilation chamber is not increased, and the air flow-out efficiency is not worsened in the entire circumference of the fixed filter.

This suction guide has a front filter attached to the outer opening having the larger diameter, and the middle part is designed in a smaller diameter, and the inner edge is curved to have a larger diameter toward the fan.

Therefore, the air flowing out from the inner edge reaches the entire surface of the fan. As a result, the air is diffused by the entire surface of the rotating fan, so that the fan can function effectively.

Since the tiny holes are curved, the air flows out smoothly along the curvature. Therefore, there is no wind screening sound generated beneath the tiny holes, and the resistance when passing through tiny holes is decreased, which makes it possible to increase the flow rate and reduce the pressure loss.

BRIEF DESCRIPTION OF THE DRAWINGS

FIG. 1 to FIG. 4 denote a first embodiment of an oil mist remover according to this invention, in which FIG. 1 is a longitudinal sectional view of the oil mist remover, FIG. 2 is an A—A line sectional view of FIG. 1, FIG. 3 is an outline perspective view seeing this remover from the front side, and FIG. 4 is an outline perspective view seeing this remover from the rear side;

FIG. 5 and FIG. 6 relate to a second embodiment of an oil mist remover according to this invention, in which FIG. 5 is a longitudinal sectional view of the oil mist remover, and FIG. 6 is a perspective view of the suction guide; and FIG. 7 to FIG. 10 represent a third embodiment of an oil mist remover according to this invention, in which FIG. 7 is a longitudinal sectional view of the oil mist remover, FIG. 8 is a partial sectional view of the side of the drum, FIG. 9 is a B—B line sectional view of FIG. 8, and FIG. 10 (a) and (b) are explanatory diagrams showing the flow of air passing through tiny holes in the drum, 10 (a) showing the tiny holes of this invention and 10 (b) denoting tiny holes of the prior art.

DETAILED DESCRIPTION OF THE INVENTION

Figure 1:
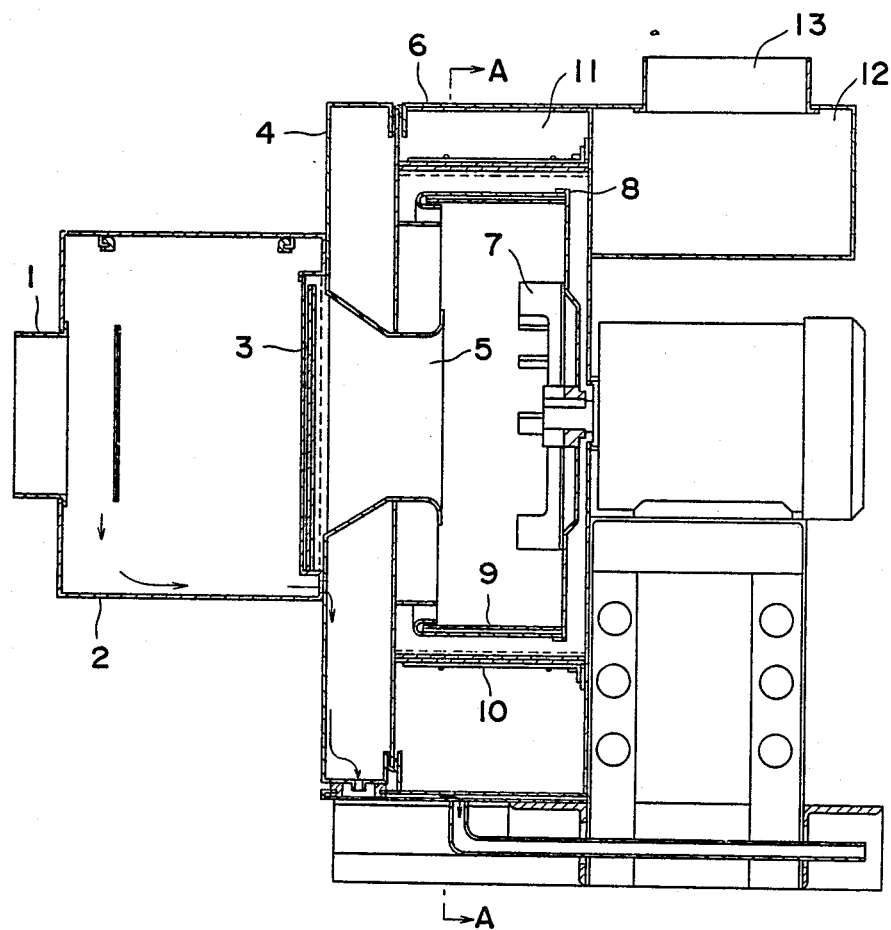
Figure 2:
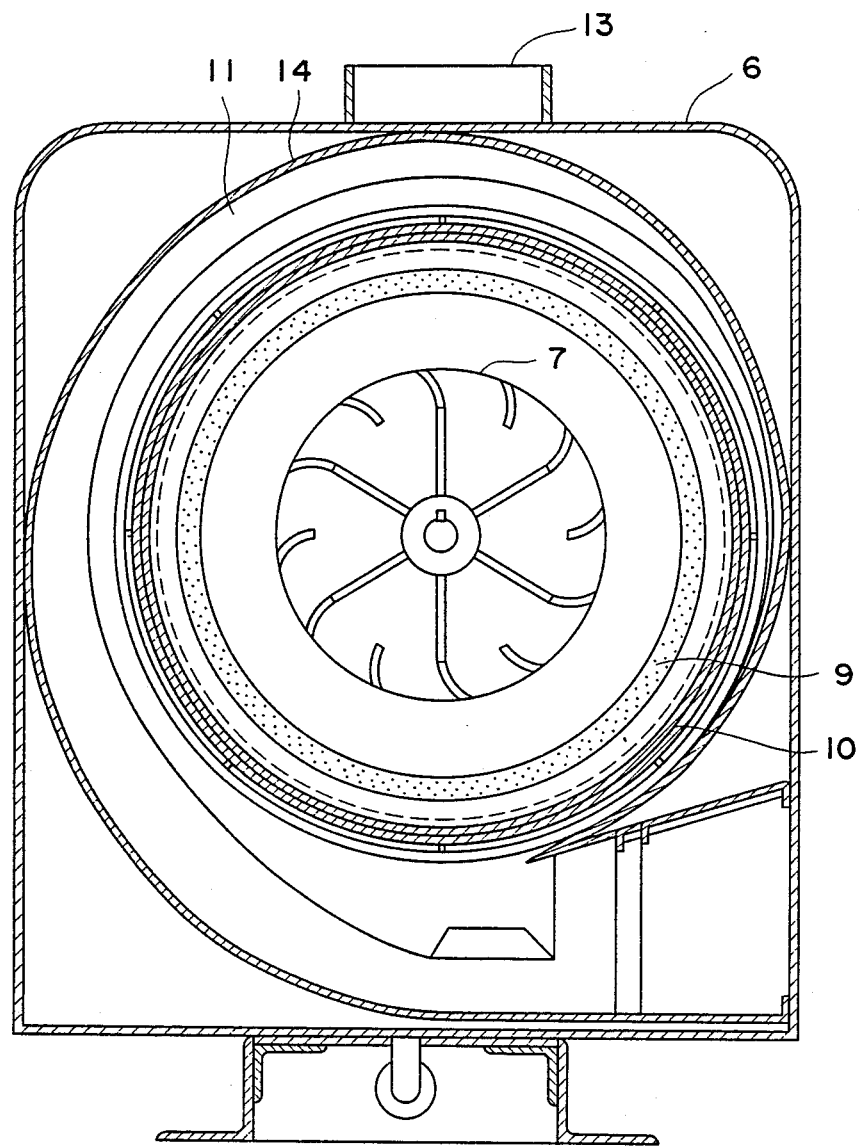
Figure 3:
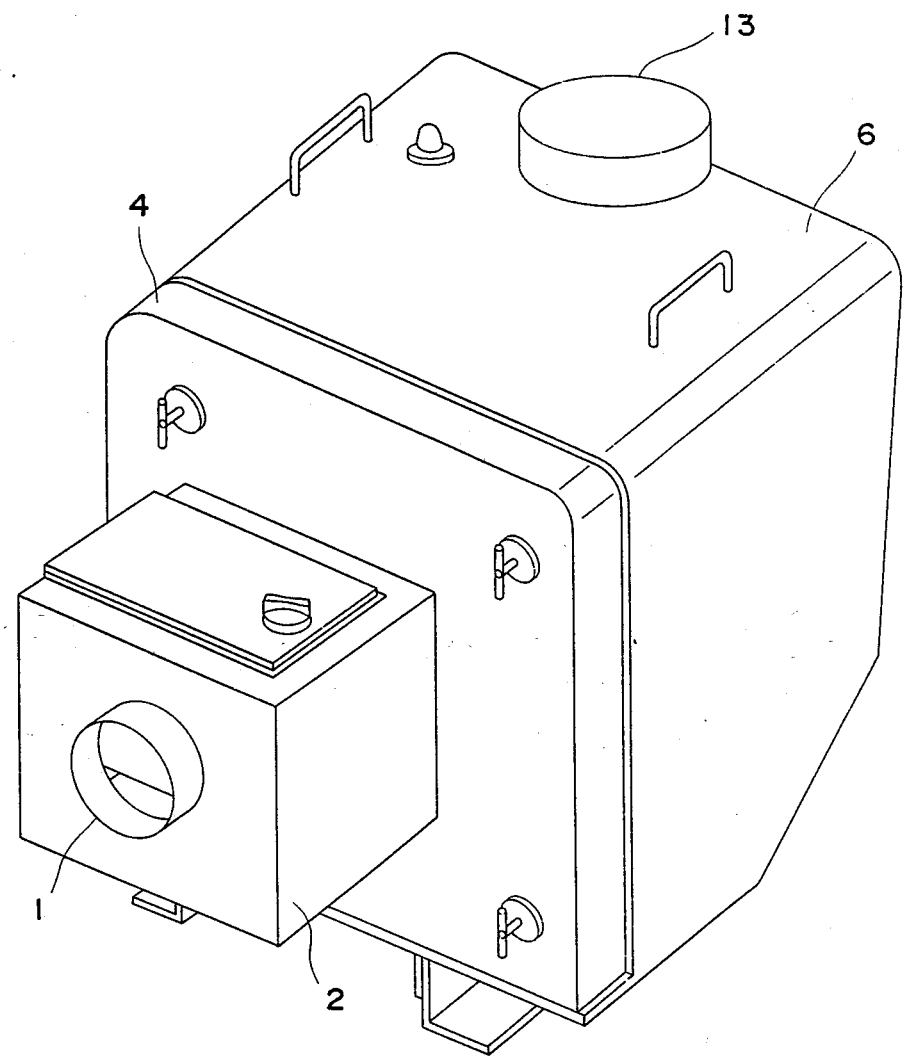
Figure 4:
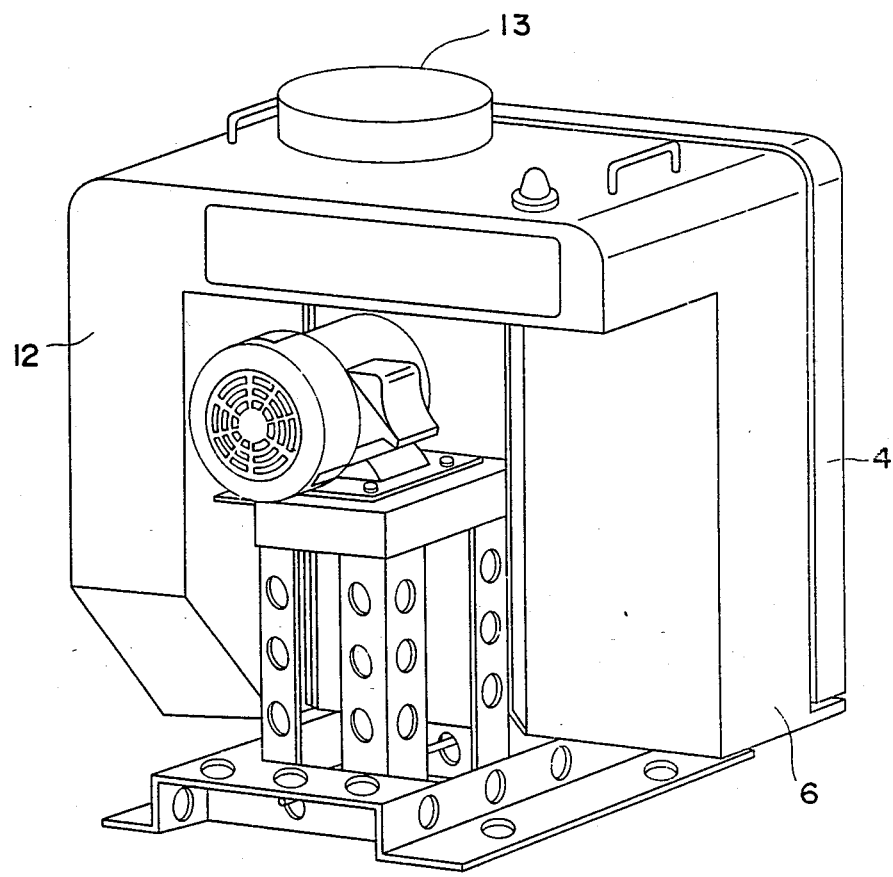

Referring now to the drawings, preferred embodiments of this invention are described below in details.

FIG. 1 to FIG. 4 denote a first embodiment of an oil mist remover of this invention, and the outline of the shown oil mist remover is first explained.

In this equipment, as shown in FIG. 1, the air inhaled through a suction hole 1 enters a straightening box 2, and is diffused outside of a drum 8 by a fan 7 in a main body case 6 through a suction guide 5 penetrating through a front filter 3 and a door 4. This drum 8 is provided with a rotary filter 9, and the air passing through this rotary filter 9 further passes through a fixed filter 10, runs through a ventilation chamber 11 and a guide hole 12 provided in the rear part of the main body case 6, and is discharged from an exhaust hole 13 formed on the main body case 6.

In the oil mist remover of this invention, filters such as rotary filter 9 and fixed filter 10 are disposed outside the fan 7, and the ventilation chamber 11 is formed outside these filters, and the ventilation chamber 11 is formed to be gradually larger toward the rotating direction of the fan 7.

In other words, this ventilation chamber 11, forming a guide wall 14 spirally inside the main body case 6, gradually increases in the interval between the fixed filter 10 and the guide wall 14 as going forward.

As the fan 7 rotates, the air is sent out from the entire circumference of the fixed filter 10. At this time, if the size of the ventilation chamber 11 is the same between the front side and the rear side, the pressure in the ventilation chamber 11 becomes larger as going forward, and discharge of air from the fixed filter 10 decreased in the front part of the ventilation chamber 11. In this invention, however, since the ventilation chamber 11 is larger toward the front direction, the air pressure in the ventilation chamber 11 is not increased by the air successively sent out from the entire circumference of the fixed filter 10, and the air flow-out efficiency will not be impaired along the entire circumference of the fixed filter 10.

Accordingly, in this equipment, the air passage is smooth, and the oil mist and dust can be removed in an efficient state.

Figure 5:
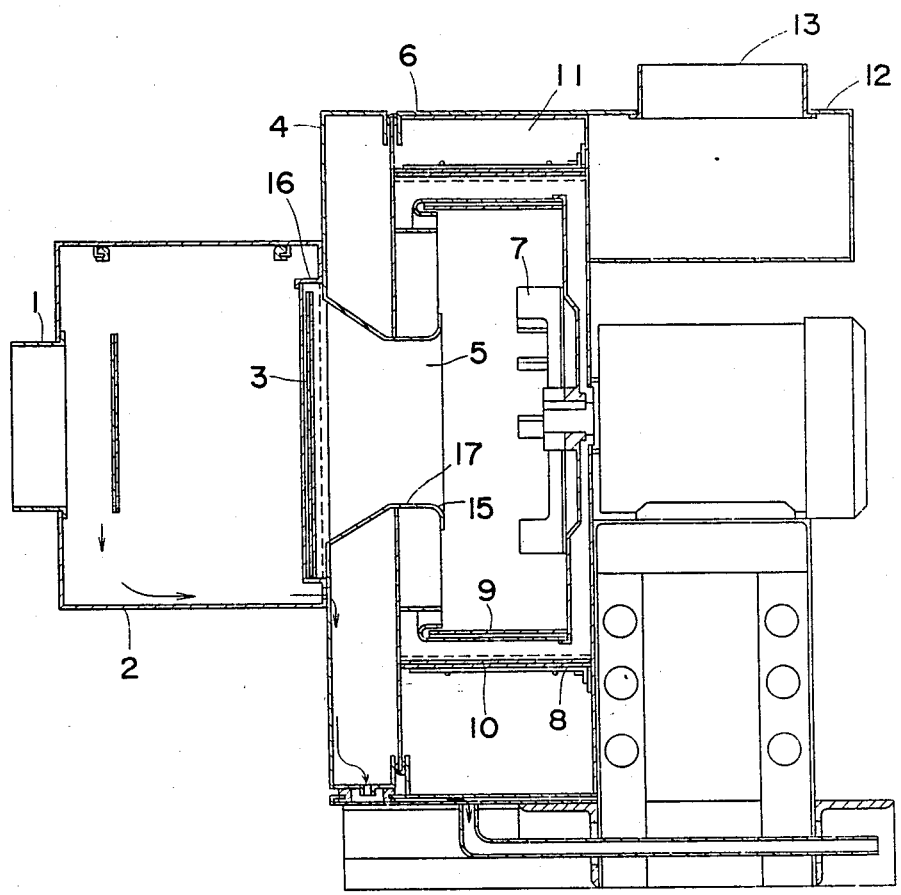
Figure 6:
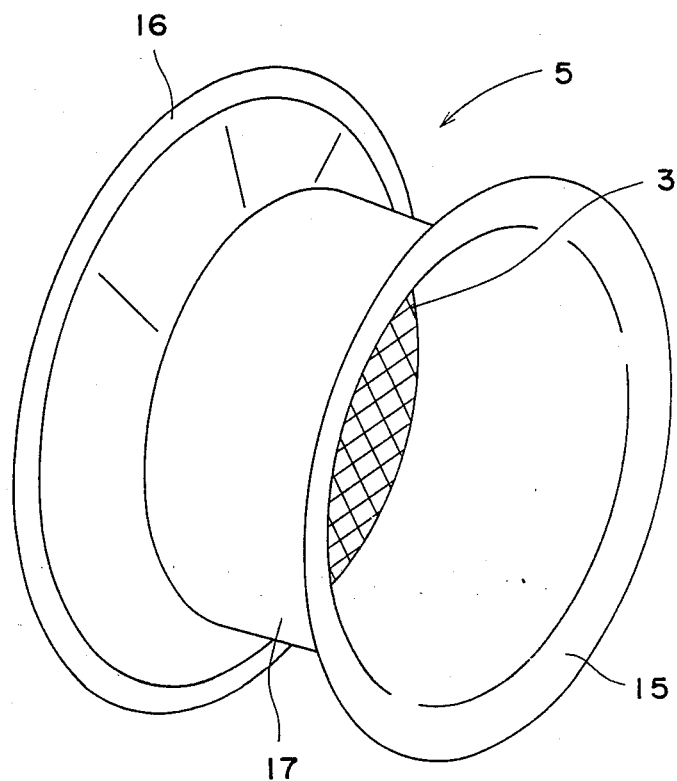

FIG. 5 and FIG. 6 denote a second embodiment of this invention. What is different from the first embodiment is that the inner edge 15 of the suction guide 5 for guiding the air containing oil mist sucked in from the suction hole 1 into the fan 7 is curved so that the diameter may be larger toward the fan 7, while other members of the equipment are identical with those in the first embodiment.

In this embodiment, as shown in FIG. 5, the inner edge 15 of the suction guide 5 for guiding the air containing oil mist sucked in from the suction hole 1 into the fan 7 is curved so that the diameter may be larger toward the fan 7.

Further describing the structure of this suction guide 5, as shown in FIG. 6, the front filter 3 is fitted to the outer opening 16 having the larger diameter of this suction guide 5, and its middle part 17 is formed in a small diameter, and the inner edge 15 is curved so as to be larger in diameter toward the fan 7.

The outer opening 16 of the suction guide 5 shown in the drawing is formed in a larger outside diameter than the fan 7. This is intended to suck more air, and to form the front filter 3 in a larger size.

Moreover, the middle part 17 and the inner edge 15 of this suction guide 5 are formed in a smaller diameter than the fan 7, and the air sucked in from the outer opening 16 is once reduced in the middle part 17, but spread a widely along the shape of the inner edge 15 formed in curvature to reach the fan 7.

Therefore, the air flowing out from the inner edge 15 reaches the entire surface of the fan 7. Here, the air is diffused by the entire surface of the rotating fan 7, so that the fan 7 can function effectively.

FIG. 7 to FIG. 10 indicate a third embodiment of this invention. What is different from the first embodiment is that a drum 8 having a rotary filter 9 is disposed in the main body 6, and that multiple tiny holes 18 are provided in the drum 8, having a curvature 19 formed beneath the tiny holes 18, while other members of the equipment are identical with those of the first embodiment.

Figure 7:
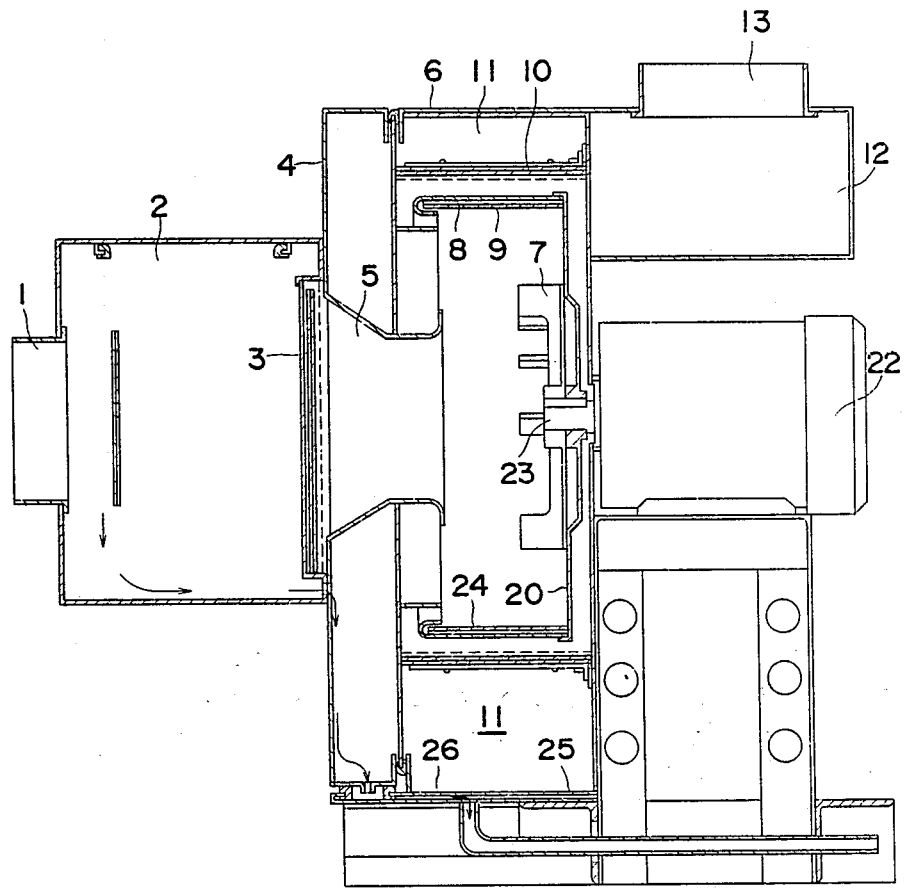
Figure 8:
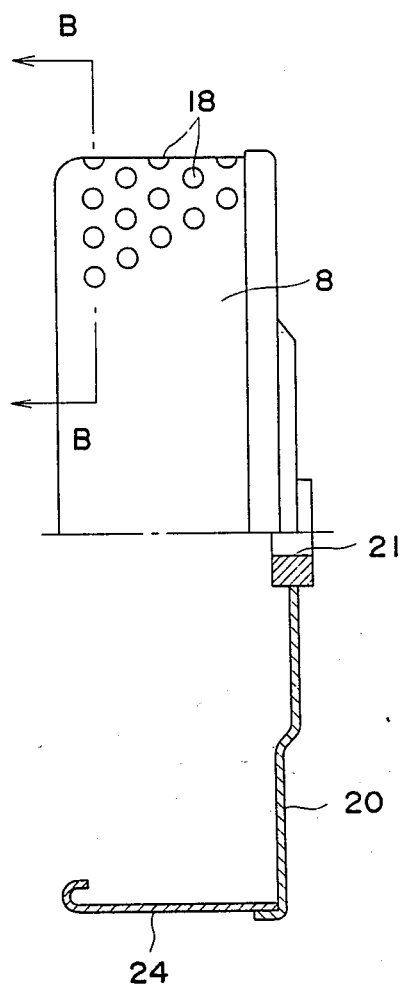
Figure 9:
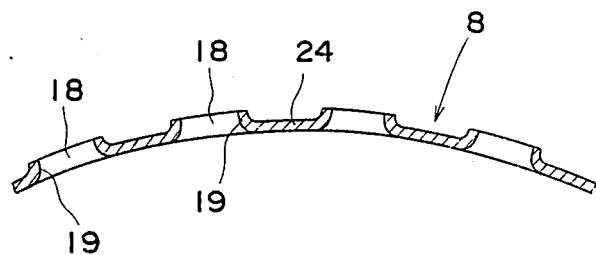

In this embodiment, as shown in FIG. 7, the drum 8 is composed of a tubular part 24 and a rear plate 20, and a boss hole 21 is provided in the middle of the rear plate 20, and it is mounted on a rotary shaft 23 of a motor 22 together with the fan 7. The rotary filter 9 is fitted to the inner side of the tubular part 24, and the tip of the tubular part 24 is turned back to the inside, and the rotary filter 9 is inserted. In the tubular part 24, multiple tiny holes 18 are opened, and a curvature 19 is formed beneath the tiny holes 18.

Figure 10A:
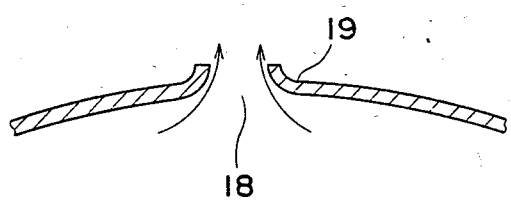
Figure 10B:
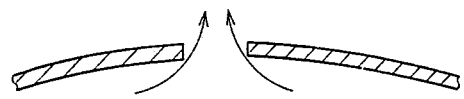

In thus composed oil mist remover, the drum 8 rotates in the same direction and at the same speed as the fan 7. The air flowing into the main body case 6 is diffused into the drum 8 by the fan, and the oil mist is separated by centrifugal force. The separated oil mist becomes larger in particle size while being adsorbed and stagnant on the rotary filter 9, and is discharged from the tiny holes 18 by the centrifugal force of the rotating drum 8, and is recovered in the drain chamber 26 through the drain holes 25 from the ventilation chamber 11. The air being rid of oil mist is discharged from the tiny holes 18 in the drum 8. Since the curvature 19 is formed in the tiny holes 18, the air smoothly flows out along the curvature 19 as shown in FIG. 10 (a). Accordingly, wind screening sound is not generated beneath the tiny holes, and the resistance when passing through the tiny holes 18 is decreased, so that it is possible to increase the flow and reduce the pressure loss.

What is claimed is:
1. An oil mist remover comprising:
   a main body into which air containing oil mist is sucked through a suction hole and then discharged through an exhaust hole after said oil mist is removed;
   a cylindrical rotary filter provided in said main body;
   a cylindrical fixed filter provided in said main body, said cylindrical fixed filter surrounding said rotary filter;
   a fan provided coaxially with and in said cylindrical rotary filter so that said fan rotates together with said rotary filter;

a driving means which drives said fan and rotary filter, said driving means bringing said air containing oil mist into said main body, sending said air to said exhaust hole through said rotary filter and fixed filter so that said oil mist is adsorbed on said filters and then forced out of said filters;

a spiral ventilation chamber provided in said main body and surrounding said fixed filter, said ventilation chamber being designed so that said air after passing through said fixed filter flows in said ventilation chamber from an inner side to an outer side, and to said exhaust hole, said ventilation chamber being further designed so that its sectional area gradually increases from said inner side to said outer side;

a guide hole provided between the outer side of said ventilation chamber and said exhaust hole, said guide hole changing the flow direction of the air coming from said outer side so as to guide such air flow to said guide hole;

an oil drain hole provided at said outer side end of said ventilation chamber so that said oil, which has been forced into said ventilation chamber through said rotary filter and fixed filter, is drained out of said ventilation chamber; and a drain chamber wherein said oil drained out through said oil drain hole is temporarily stored therein and then forced out of said main body by air pressure.

2. An oil mist removed according to claim 1, further comprising a suction guide provided between said suction hole and fan, said suction guide guiding air to said fan, and its diameter being gradually increased from its center towards both upper stream side and lower stream side thereof, the diameter of the opening of the upper stream side of said suction guide being larger than the diameter of said fan and the diameter of the opening of the lower stream side of said suction guide being smaller than the diameter of said fan, and edge of the opening of said lower stream side being curved.

3. An oil mist removed according to claim 1 or 2, wherein said cylindrical rotary filter is provided on a drum which has a plurality of tiny holes, a circumferential wall of each of said tiny holes being curved from the inside of the outside so that air can smoothly flow out of said drum.

* * * * *